2,760,867
Patented Aug. 28, 1956

2,760,867

FINISHED CHOCOLATE PRODUCT

Norman W. Kempf, Auburndale, and Paul J. Downey, Holbrook, Mass., assignors to General Foods Corporation, New York, N. Y., a corporation of Delaware No Drawing. Application August 1, 1951, Serial No. 239,856

13 Claims. (Cl. 99—24)

The present invention relates to heat resistant chocolate products and to the process for preparing the same.

Solidified chocolate, such as commonly used for coatings and other chocolate products, when subjected to temperatures above the melting point of the cocoa butter or other fat constituents, as in hot weather or in the tropics, tends to lose its desired character and shape, to become soft and unsatisfactory to handle, to exude its fat constituents at the surface, and to become sticky so that if wrapped, it sticks to the wrapper and its surface is marred when the wrapper is removed. These effects are particularly objectionable in chocolate coated confections, inasmuch as the chocolate coating constitutes an outer layer on an edible center and any tendency of the chocolate coating to flow or to adhere to the wrapper often results in an exposure of the center, not only rendering the confection unsightly, but also destroying its original identity as a chocolate coated confection.

In processing ordinary chocolate, it is conventional to grind a mixture of chocolate liquor, sugar and skim milk solids to the desired degree of fineness using ordinary roll refiners and, thereafter, to incorporate the desired amount of cocoa butter. The chocolate mixture and cocoa butter is then placed in a Conge, Melangeur, or other suitable device capable of agitating or working the mixture and of providing aeration so that certain undesired aromas will be allowed to escape. Because of such working or continued agitation which usually involves further grinding, the sugar and skim milk solids become completely coated with fat. This last step is commonly referred to as "finishing" and is necessary to the development of the finished chocolate flavor. The resulting mixture or "paste" is then tempered and either formed into a finished product or cast in the form of cakes which are stored for subsequent use.

According to the usual commercial practice in making chocolate coatings, the stored material as above described is prepared for the enrobing operation by remelting and tempering. After enrobing, the mixture sets to solid state when cooled until the fat is crystallized, but reverts to its original soft, fluid condition when subsequently subjected to a temperature which melts the fat.

In the production of heat resistant or shape-sustaining chocolate products, it has been proposed, in order to cope with the problem described above, to rely upon processing methods which provide for a reduced amount of working so as to leave a certain proportion of the surfaces of the sugar and skim milk particles naked of any fat film, the fat being melted and distributed only over sufficient of the particle surfaces to produce the degree of fluidity necessary for the operation which is to be performed. When such a mixture first sets, the mass becomes interspersed with a plurality of bonds between the contiguous bare faces of sugar particles, which bonds are formed through reaction with the moisture in the mass. This causes heavy internal friction so that the mass resists deformation even though the fat subsequently becomes melted at high temperatures. Thus, molded chocolate bars have been made which will remain set at summer or tropical temperatures. When subjected to these temperatures, some oiling off may take place, but the internal friction caused by the bonds between contiguous bare faces of the sugar particles is great enough to prevent the surface of the bar from being carried away when the wrapper is removed.

The disadvantages in the above described product reside in the fact that the chocolate product prepared in accordance with the above described process does not have, as described hereinafter, a "finished" chocolate flavor and, moreover, such product cannot satisfactorily be used for the purpose of enrobing edible centers or otherwise. When a chocolate composition is to be used for enrobing, the mixture must be more fluid than a mixture adequate for extrusion into a mold. The plasticity of the mixture is directly proportional to the extent to which the particle surfaces of the ingredients other than fat are coated by melted fat. Consequently, when the mixing is carried to the point at which there will be sufficient fat coated particles to provide the necessary plasticity for the enrobing operation, there will not be enough fat-free surfaces left to build up internal friction when the fat is subsequently melted, and thereby to sustain the coating.

In order to provide sufficient fluidity to enable a chocolate product of the above type to be handled satisfactorily in an enrobing operation, it has been proposed to create a condition of temporary fluidity by the addition of a small amount of water to the basic composition before mixing, say, of the order of 2–3%. When this product is ground on conventional roll refiners, as in the above-described process, some of this water is lost by evaporation, but sufficient remains to preserve a wet surface on some of the non-fat solid particles. Then, when this product is subsequently worked to break it down to paste consistency, the force of working creates unstable fat films on the surfaces of the water-wet particles, giving a temporary fluidity which lasts long enough to permit the desired use or application of the chcolate. Because of the moisture beneath some of the fat films, however, the films break down subsequent to the enrobing operation, resulting in a "set" product which resists flow due to the bonds which are formed between the contiguous bare faces of some of the sugar particles.

Although the improvement described above gives the necessary fluidity for enrobing candy centers and casting chocolate materials into bars, there are several attendant disadvantages. First, as in the preceding process, there has been no preparation for a finished flavor. In the case of regular chocolate products which will not resist flow when subjected to temperatures above the melting point of the fat, the separate flavors of the ingredients are combined as a result of the extended agitation and the undesirable chocolate aromas are removed as a result of aeration during such extended agitation. As a result, the consumer perceives only one flavor and not the separate flavors of the various ingredients, such as the cocoa beans, skim milk, sugar, etc. On the other hand, with the shape-sustaining chocolate products prepared in accordance with the two aforedescribed processes, it is impossible to provide a "finished" flavor since, in order to provide sufficient fat-free surfaces so that the product will retain its shape at temperatures above the melting point of the fat, the various ingredients cannot be mixed for a length of time sufficient to combine the flavors of the various ingredients and to remove the undedsirable aromas. A second disadvantage of these two processes resides in the limited amount of fat that can be contained in such a product, the amount of fat or cocoa butter being less than 28% and 35%, respectively. If the respective fat contents are exceeded in either of the two processes, the advantages connected with the described heat resistance are rapidly lost. A third disadvantage of the last described process is that in order to obtain the desired fluidity it is necessary to subject the chocolate material to special processing steps in the confectioner's plant. In using regular chocolate which has no heat resistant properties, the confectioner is simply required to melt the chocolate block supplied for coating purposes by raising the temperature of the same to 92°–110° F. However, in the case of the shape-sustaining chocolate containing the added 2–3% water, it is necessary that the confectioner employ special equipment or apparatus such as a Melangeur in order to work the materials to a sufficient extent to obtain the desired fluidity. Moreover, although the fluidity is suitable for both molding and enrobing purposes, it is far from satisfactory and, once the chocolate material has been worked to a condition of temporary fluidity, it must be used immediately and not allowed to solidify. If it is not so used but allowed to solidify, the shape-sustaining properties will be lost upon subsequent attempts to rework the material to provide the necessary fluidity.

A further improvement to the above-described processes has been to treat the finished shape-sustaining chocolate product, for example enrobed edible centers, bars and the like, so as to prevent "oiling off" of the fat at the surface when the product is exposed to temperatures above the melting point of the fat. In such treatment the heat resistant chocolate product, in which the surfaces of many of the skim milk solids and sugar are free from fat, is subjected to the application of moisture while the chocolate coating or cast product is still in a hot plastic state. This results in causing some of the sugar in the mix to dissolve in the moisture to form a sugar syrup film on the surface so that upon drying and cooling the film is solidified into a thin skin of crystalline sugar. This sugar skin effectively keeps the wrapper from contacting the underlying chocolate mass, and being derived from the coating itself the crystalline structure of the inner surface of this skin extends into the surface of the coating and interlocks closely with the microscopically rough surface of the bonds between the contiguous bare faces of the sugar particles. The firm interlocked relation of the sugar skin to the surface of the coating prevents the sugar skin from chipping off or becoming detached. Moreover, while some of the fat may melt under the skin, and some of it reach the surface, by exuding between crystalline interfaces of the sugar skin structure, the texture of the skin is such that the solid particles which cause stickiness are held back and do not reach the surface so that the coating does not adhere to the wrapper, with the result that there is no damage to the surface of the product when the wrapper is removed.

While the above-described process is effective in preventing oiling off resulting in the adherence of the coating to the wrapper, it provides substantially no shape retaining characteristics. Consequently, in order to provide a heat resistant product which will retain its shape or set at temperatures above the melting point of the fat, chocolate mixtures prepared according to the aforedescribed processes in which there are fat-free surfaces must be used in order to provide a chocolate product which is acceptable during the heat of the summer or at all times in the tropics. However, as evident from the foregoing, all of such chocolate products as will retain their shape or set at elevated temperatures have been unacceptable in that they do not have a "finished" chocolate flavor, cannot be used for enrobing edible centers, or require the use of special equipment by the confectioner and cannot be reworked after having once been allowed to set. It is easily seen, therefore, that the provision for an edible chocolate product which will not lose its set when exposed to temperatures above the melting point of the fat and which is free from the aforedescribed disadvantages is highly desirable.

It is an object of the present invention to provide edible chocolate products having the characteristic "finished" chocolate flavor and capable of retaining their shape and character at elevated temperatures.

Another object of the invention is to provide chocolate goods which can be used by the confectioner in the preparation of heat resistant chocolate and chocolate coated products without requiring the use of special processing equipment.

A further object of the invention is to provide chocolate goods which can be softened or melted in the conventional way and formed into chocolate and chocolate coated products capable of retaining their shape and character at elevated temperatures.

Still further objects of the present invention will become apparent from the description that follows hereinafter.

It has now been found that a heat resistant chocolate, having a completely blended or "finished" chocolate flavor, which will retain its "set" when exposed to temperatures above the melting point of the fat can be produced by treating, as described in detail hereinafter, "finished" chocolate goods containing skim or non-fat milk solids, with a small percentage of water containing an emulsifier capable of providing for the preferential absorption of the moisture by the skim milk solids even though the latter have been thoroughly wetted by the cocoa butter. The result is that the skim milk solids become swollen and at least partially joined and interbonded so as to provide a supporting structure which will be maintained even though the fat content of the chocolate is subsequently heated above its melting point and is in a fluid condition. Moreover, it has also been found that such a chocolate product can be used for casting bars and enrobing candy centers in conventional depositing and enrobing machines without the necessity of resorting to the use of special working or extruding equipment.

In order to provide for the preferential absorption of water by the skim milk solids or non-fat milk solids after the chocolate mixture has been worked to produce the finished flavor, it is necessary to employ a suitable emulsifier which is capable of providing for such absorption despite the fact that the skim milk solids have become completely coated with cocoa butter and/or other fats as a result of the finishing operation. Any suitable emulsifier or surface active agent can be employed in this connection. To determine whether or not a given emulsifier is capable of providing for the desired preferential absorption it can be employed and its effectiveness determined by microscopic examination of the chocolate. The preferential absorption by the skim milk solids is readily detected by their pronounced swollen condition. Moreover, the water may contain a suitable dye for the purpose of facilitating the determination of the swollen condition of the skim milk solids by microscopic examination. Examples of suitable emulsifiers are lecithin, polyoxyethylene sorbitan mono-oleate, sorbitan monostearate, sorbitan mono-oleate, polyoxyethylen sorbitan monostearate, sorbitan monopalmitate, polyoxyethylene sorbitan monopalmitate and the like. Of the various emulsifiers tested to date, however, lecithin is by far the most efficient for providing for the preferential absorption of the water by the skim milk solids, not only from the standpoint of ease of operation but also, more important, from the standpoint of uniformity of water distribution.

The amount of water to be combined with the chocolate mixture depends, for the most part, on the skim milk solids contained therein. In the case of a product containing a relatively low percentage of skim milk solids, say, 9%, the amount of water to be incorporated is of the order of 1–2%, whereas in the case of chocolate containing, say, 20% skim milk solids, the proportion of water added is 2–3%. When a proportion of water is added in excess of the proportions given above, it will result in the chocolate having too much structure and, therefore, too firm a set so that the desired fluidity which is necessary for casting the chocolate in bars or using it to enrobe candy centers in conventional apparatus will be lost. On the other hand, the proportion of water to be employed with respect to the skim milk solids must be adequate to provide the necessary degree of swelling and those which are appreciably less than the proportions discussed above will not cause the skim milk solids to swell to a sufficient extent to provide the desired firm structure and set.

The water emulsion should be added to the "finished" chocolate mixture under carefully controlled conditions of temperature and agitation. More specifically, it has been found that the temperature of the product should be maintained at about 86° F. to about 95° F. which at the same time should be subjected to vigorous agitation. When the temperature of the product falls below 86° F., the crystallization of the fat content will have proceeded to a point at which agitation of the product becomes difficult. On the other hand, when the temperature of the product is in excess of 95° F., the product tends, for reasons unknown, to set, again making agitation difficult, if not impossible. As aforementioned, the product should be agitated during the addition of the water so as to provide for uniform water distribution and uniform swelling of the individual skim milk particles. In order to accomplish the uniform addition of the emulsion to the agitated product, it is preferred to spray the emulsion uniformly over the surface of the agitated product. After the emulsion has been uniformly dispersed through the product, the product should be further agitated to cause the water-phase of the emulsion to be substantially absorbed by the non-fat milk solids. In this respect, it is important that the temperature of the product be maintained within the aforementioned range, namely, 86°–95° F. The average time required to cause the water-phase to be substantially absorbed by the non-fat milk solids has been found to be about 1½ to 2 hours, depending upon the type of apparatus used, the particular degree of agitation, and the type of chocolate being processed.

The product is then tempered in accordance with conventional commercial practices and either formed in a finished product as for example by the use of a depositor or enrober, or cast in the form of blocks which may be stored for subsequent use by a confectioner for the purpose of enrobing edible centers or as otherwise desired.

When the confectioner receives the cast product, it is prepared for its ultimate use by simply heating to a temperature between 90° F. and 100° F. with moderate agitation, then retempered according to the usual commercial practices. It is then in the desirable fluid state for use, whether in a depositor for forming bars of chocolate, or in an enrober for coating edible centers.

A typical example employing the process of the present invention follows:

A mixture of the following composition is mixed together and ground on an ordinary roll refiner with the purpose of reducing the particle size:

10.00 lbs. chocolate liquor
    18.00 lbs. milk solids
    47.00 lbs. sugar
    10.00 lbs. cocoa butter Thereafter, an additional 15.00 lbs. of cocoa butter is added to the ground material and worked until substantially all of the solid particles are encased in melted fat. This working is carried out in a Conge at a temperature of 120° F. for at least 24 hours. At the end of this time the chocolate material is transferred to a closed agitating apparatus, jacketed to maintain the chocolate at a temperature of 92°–93° F. and equipped with paddle type agitator blades which revolve about a horizontal axis. Using this apparatus to supply the agitation, 2.00 lbs. of an aqueous emulsion containing 3 ozs. of lecithin is added in the form of a spray over a period of five minutes and then agitation is thereafter continued for an additional hour to insure uniform dispersion of the moisture to provide uniform swelling of the skim milk particles. Shortly after the moisture addition the viscosity of the chocolate becomes increased to a point where agitation is extremely difficult, but by the end of the additional hour of agitation the viscosity has been nearly reduced to its original value.

The material is then tempered and may be used in conventional enrobing or depositing machines to coat candy centers or prepare bars. On the other hand, it may be cast into a block after the tempering, which can be shipped into a confectioner for the purpose of preparing bars or enrobing candy centers. Upon arrival at the confectioner's plant he may employ it for example in enrobing candy centers by simply elevating the temperature of the chocolate, with moderate agitation, to a temperature within the range of 90°–100° F. and, thereafter, conveying the same to the enrober.

While a solidified chocolate product prepared in accordance with the present invention has an internal structure consisting of non-fat milk solids which are swollen by the absorption of water and are at least partially joined so as to render the product self-sustaining at temperatures above the melting point of the fat constituents thereof, the presence of the low melting fat may nevertheless cause some "oiling off" on the surface when subjected to temperatures above the melting point of the fat. For this reason, it may be desired to provide a continuous sugar skin of the type described hereinbefore about the surface of the finished chocolate product. In such a case moisture is applied to the surface of the finished chocolate product, for example an edible center which has been enrobed with the self-sustaining chocolate of the present invention, and the like. This moisture is absorbed on the surfaces of the product and dissolves some of the sugar which, upon recrystallization through evaporation, produces a continuous integral skin of sugar crystals uniformly interlocked with the structure of the coating depthwise.

By way of example, the coated products may be placed on a stationary mesh support located in and above the floor of a chamber in which the air is maintained substantially saturated with moisture at a temperature of about 90° F. for two to seven minutes. The products are then placed in a suitable cooling chamber or tunnel in which the cocoa butter is frozen and the skin formed as described above. During cooling the products may be supported on the usual chocolate dipping paper which appears to absorb the moisture from the film and then to permit its evaporation to the surrounding atmosphere. However, high temperatures tend to cause discoloration of the chocolate and it is, therefore, preferable to maintain the temperature of the atmosphere as little above that of the coating as is necessary to obtain a sufficient skin. Thus in the usual enrobing operation referred to above, the relatively thin coating of chocolate is applied at about 90° F. to the larger and cooler edible center and the products then conveyed to the point of application of the moisture. Under these conditions good results can be obtained with an atmosphere at 84° F., the relative humidity being maintained at about 96% and the time of exposure of the product thereto being approximately two minutes.

While the invention has been described with respect to a specific example and operating details, it is to be understood that the invention is not restricted thereto and that the scope of the present invention is to be determined solely by reference to the appended claims.

What is claimed is:

1. In a process for making a solidified chocolate product which is self-sustaining at temperatures above the melting point of cocoa butter, the steps of forming a mixture of chocolate, cocoa butter, sugar, and milk solids, processing the mixture to wet substantially all of the surfaces of the solid particles of the mix with fat and to develop a finished chocolate flavor, adding to the mixture a water emulsion of an emulsifier, whereby the water-phase of the emulsion is substantially absorbed only by the non-fat milk solids of the mixture, the amount of added water being not more than about 3% of the total mixture and then forming a finished product in which the non-fat milk solids are swollen by the absorption of the water and at least partially joined so as to render the product self-sustaining at temperatures above the melting point of the cocoa butter.

2. In a process for making a solidified chocolate product which is self-sustaining at temperatures above the melting point of cocoa butter, the steps of forming a mixture of chocolate, cocoa butter, sugar, and milk solids, processing the mixture to wet substantially all of the surfaces of the solid particles of the mix with fat and to develop a finished chocolate flavor, adding a water emulsion of an emulsifier and working the mixture to disperse the emulsion evenly so that the water-phase is substantially absorbed by the non-fat milk solids, the amount of added water being not more than about 3% of the total mixture and then forming a finished product in which the non-fat milk solids are swollen by the absorption of the water and at least partially joined so as to render the product self-sustaining at temperatures above the melting point of the cocoa butter.

3. In a process for making a solidified chocolate product which is self-sustaining at temperatures above the melting point of cocoa butter, the steps of forming a mixture of chocolate, cocoa butter, sugar, and milk solids, processing the mixture to wet substantially all of the surfaces of the solid particles of the mix with fat and to develop a finished chocolate flavor, adding a water emulsion of an emulsifier and agitating the mixture during the addition of the emulsifier to disperse the emulsion evenly, then working the mixture so that the water-phase of the emulsion is substantially absorbed by the non-fat milk solids, the amount of added water being not more than about 3% of the total mixture maintaining the mixture during such agitation and working at a temperature within the range of about 86° F. to about 95° F., and then forming a finished product in which the water-swollen non-fat milk solids are at least partially joined and interbonded so as to render the product self-sustaining at temperatures above the melting point of the cocoa butter.

4. In a process for making a solidified chocolate product which is self-sustaining at temperatures above the melting point of cocoa butter, the steps of forming a mixture of chocolate, cocoa butter, sugar, and milk solids, processing the mixture to wet substantially all of the surfaces of the solid particles of the mix with fat and develop a finished chocolate flavor, adding in the form of a fine spray a water emulsion of an emulsifier while agitating the mixture to disperse the emulsion, then working the mixture to reduce it to a flowable consistency and to substantially absorb the water-phase of the emulsion in the non-fat milk solids, the amount of added water being not more than about 3% of the total mixture maintaining the mixture during such agitation and working at a temperature within the range of about 86° F. to about 95° F., and then forming a finished product in which the water-swollen non-fat milk solids are at least partially joined so as to render the product self-sustaining at temperatures above the melting point of the cocoa butter.

5. In a process for making a solidified chocolate product which is self-sustaining at temperatures above the melting point of cocoa butter, the steps of forming a mixture of chocolate, cocoa butter, sugar, and milk solids, processing the mixture to wet substantially all of the surfaces of the solid particles of the mix with fat and to develop a finished chocolate flavor, adding to the mixture a water emulsion of an emulsifier while vigorously agitating the mixture to disperse the emulsion evenly, then vigorously agitating the mixture for at least 30 minutes so that the water-phase of the emulsion is substantially absorbed by the non-fat milk solids, the amount of added water being not more than about 3% of the total mixture maintaining the mixture during such agitation and working at a temperature within the range of about 86° F. to about 95° F., and then forming a finished product in which the water-swollen non-fat milk solids are at least partially joined and interbonded so as to render the product self-sustaining at temperatures above the melting point of the cocoa butter.

6. In a process for making a solidified chocolate product which is self-sustaining at temperatures above the melting point of cocoa butter, the steps of forming a mixture of chocolate, cocoa butter, sugar, and milk solids, processing the mixture to wet substantially all of the surfaces of the solid particles of the mix with fat and to develop a finished chocolate flavor, adding 1 to 3% water to the mixture in the form of an emulsion containing an emulsifier while agitating the mixture to disperse the emulsion evenly, then working the mixture so that the water-phase of the emulsion is substantially absorbed by the non-fat milk solids, maintaining the mixture during such agitation and working at a temperature within the range of about 86° F. to about 95° F., and then forming a finished product in which the water-swollen non-fat milk solids are at least partially joined and interbonded so as to render the product self-sustaining at temperatures above the melting point of the cocoa butter.

7. In a process for making a solidified chocolate product which is self-sustaining at temperatures above the melting point of cocoa butter, the steps of forming a mixture of chocolate, cocoa butter, sugar, and milk solids, processing the mixture to wet substantially all of the surfaces of the solid particles of the mix with fat and to develop a finished chocolate flavor, forming a water emulsion containing an emulsifier and an alkali, adding the emulsion to the mixture while agitating the mixture to disperse the emulsion evenly, then working the mixture so that the water-phase of the emulsion is substantially absorbed by the non-fat milk solids, the amount of added water being not more than about 3% of the total mixture, maintaining the mixture during such agitation and working at a temperature within the range of about 86° F. to about 95° F., and then forming a finished product in which the water-swollen non-fat milk solids are at least partially joined and interbonded so as to render the product self-sustaining at temperatures above the melting point of the cocoa butter.

8. A finished chocolate product containing milk solids and not over about 3% water in which the non-fat constituents are dispersed in a continuous phase of the fat constituents and which will be self-sustaining at temperatures above the melting point of the cocoa butter constituent thereof, characterized by the absorption of water by substantially only the non-fat milk solids which are swollen and at least partially joined and interbonded so as to give shape stability to the solidified product when heated above the melting point of the cocoa butter.

9. A solidified confection containing finished chocolate, cocoa butter, milk solids and not more than about 3% water in which the non-fat constituents are dispersed in a continuous phase of the fat constituents and which will be self-sustaining at temperatures above the melting point of the cocoa butter, characterized by substantially all of the water being absorbed by the non-fat milk constituents which are swollen and at least partially joined and interbonded, so as to give shape stability to the solidfied chocolate when heated above the melting point of the cocoa butter.

10. A process for making a solidified chocolate product which is self-sustaining at temperatures above the melting point of cocoa butter which comprises processing a mixutre of chocolate, cocoa butter, sugar, and milk solids to wet substantially all of the surfaces of the solid particles of the mix with fat and to develop a finished chocolate flavor in the mix, then adding a water emulsion of lecithin and dispersing said emulsion throughout the mix to cause the water-phase of the emulsion to be substantially absorbed only by the non-fat milk solids of the mix, the amount of added water being not more than about 3% of the total mixture and then forming the mix into a finished product in which said non-fat milk solids are swollen by the absorption of the water and at least partially joined so as to render said product self-sustaining at temperatures above the melting point of the cocoa butter.

11. A process for making a solidified chocolate product which is self-sustaining at temperatures above the melting point of cocoa butter which comprises processing a mixture of chocolate, cocoa butter, sugar, and milk solids to wet substantially all of the surfaces of the solid particles of the mix with fat and to develop a finished chocolate flavor in the mix, maintaining the temperature of the mix in the range of about 86° F. to 95° F. while adding a water emulsion of lecithin and dispersing said emulsion throughout the mix to cause the water-phase of the emulsion to be substantially absorbed only by the non-fat milk solids of the mix, the amount of added water being not more than about 3% of the total mixture and then forming the mix into a finished product wherein the water-swollen non-fat milk solids are at least partially joined and interbonded so as to render the product self-sustaining above the melting point of the cocoa butter.

12. A process for making a solidified chocolate product which is self-sustaining above the melting point of cocoa butter which comprises processing a mixture of chocolate, cocoa butter, sugar, and milk solids to wet substantially all the surfaces of the solid particles of the mix with fat and to develop a finished chocolate flavor in the mix, maintaining the temperature of the mix in the range of about 86° F. to 95° F. while adding from 1% to 3% water in the form of an emulsion of lecithin and dispersing said emulsion throughout the mix to cause said water to be substantially absorbed only by the non-fat milk solids of the mix, and then forming the mix into a finished product wherein the water-swollen milk solids are partially joined and interbonded so as to render the product self-sustaining above the melting point of the cocoa butter.

13. A process for making a finished solidified chocolate product which is self-sustaining at temperatures above the melting point of cocoa butter which comprises processing a mixture of chocolate, cocoa butter, sugar, and milk solids to wet substantially all of the surfaces of the solid particles of the mix with fat and to develop a finished chocolate flavor in the mix, then adding a water emulsion of an emulsifier selected from the group consisting of lecithin, long chain fatty acid partial esters of hexitol anhydrides, and polyoxyalkylene derivatives of said esters, dispersing said emulsion throughout the mix to cause the water-phase of the emulsion to be substantially absorbed only by the non-fat milk solids of the mix, the amount of added water being not more than about 3% of the total mixture and then forming the mix into a finished product in which said non-fat milk solids are swollen by the absorption of the water and at least partially joined so as to render said product self-sustaining at temperatures above the melting point of the cocoa butter.

References Cited in the file of this patent

UNITED STATES PATENTS

| | | |
|---|---|---|
| 2,457,110 | Burbank | Dec. 28, 1948 |
| 2,487,931 | Lataner | Nov. 15, 1949 |
| 2,543,209 | Verdier | Feb. 27, 1951 |
| 2,586,615 | Cross | Feb. 19, 1952 |